United States Patent
Oh et al.

[11] Patent Number: 5,955,835
[45] Date of Patent: *Sep. 21, 1999

[54] WHITE-LIGHT EMITTING ELECTROLUMINESCENT DISPLAY DEVICE AND MANUFACTURING METHOD THEREOF

[75] Inventors: Myung Hwan Oh; Task Sang Hahn; Yun Hi Lee, all of Seoul; Seong Jae Jeung, Kumi; Young Dae Ju, Tacku; Jin Ho Sunwoo, Kumi, all of Rep. of Korea

[73] Assignee: Korea Institute of Science and Technology, Seoul, Rep. of Korea

[ * ] Notice: This patent is subject to a terminal disclaimer.

[21] Appl. No.: 08/764,792

[22] Filed: Dec. 12, 1996

Related U.S. Application Data

[63] Continuation of application No. 08/551,733, Nov. 1, 1995, abandoned.

[30] Foreign Application Priority Data

Jan. 20, 1995 [KR] Rep. of Korea ................. 95/923

[51] Int. Cl.[6] ................................................ H05B 33/14
[52] U.S. Cl. .......................... 313/503; 313/506; 313/509
[58] Field of Search .................................... 313/506, 509, 313/503; 315/169.3; 252/301.4 S, 301.4 H

[56] References Cited

U.S. PATENT DOCUMENTS

| | | |
|---|---|---|
| 4,643,639 | 2/1987 | Kawai . |
| 4,733,128 | 3/1988 | Tohda et al. . |
| 5,003,221 | 3/1991 | Shimizu . |
| 5,200,277 | 4/1993 | Nakayama et al. . |
| 5,352,543 | 10/1994 | Ryu . |
| 5,476,727 | 12/1995 | Maruta . |

OTHER PUBLICATIONS

S. Tanaka et al., "Bright White–Light Electroluminescent Devices With New Phosphor Thin–Films Based on SrS", SID 88 Digest, pp. 293–296 no month.

*Primary Examiner*—Ashok Patel
*Attorney, Agent, or Firm*—Morrison & Foerster

[57] ABSTRACT

An improved white-light emitting electroluminescent display device and a manufacturing method thereof capable of advantageously generating a light having a red, blue, and green wave lengths within a unique material, which includes a substrate; a lower electrode disposed on the substrate; a first dielectric layer disposed on the lower electrode; a ZnS:Pr,Mn light-emitting layer disposed on the first dielectric layer; a second dielectric layer; and an upper electrode disposed on the second dielectric layer. In addition, a fabrication method thereof includes the steps of forming a first dielectric layer on an upper electrode; forming a light-emitting layer on the first dielectric layer by depositing a ZnS:Pr,Mn luminescent material made of Pr of 1.4~0.5 mol % and Mn of 0.1~0.01 mol % on a ZnS host material; forming a second dielectric layer on the light-emitting layer; and forming a lower electrode on the second dielectric layer.

12 Claims, 4 Drawing Sheets

WHITE-LIGHT EMITTING ELECTROLUMINESCENT DISPLAY DEVICE AND MANUFACTURING METHOD THEREOF

This application is a continuation of Ser. No. 08/551,733 filed Nov. 1, 1995 now abandoned.

BACKGROUND OF THE INVENTION

1. Field of the Invention

The present invention relates to a white-light emitting electroluminescent display device (ELD) and a manufacturing method thereof, and in particular to an improved white-light emitting electroluminescent display device and a manufacturing method thereof capably of advantageously emitting light containing red, blue, and green wave lengths within a unique material.

2. Description of the Conventional Art

For use of a wide and high definition screen adapted in a so-called High Definition Television (HDTV) and the like, a flat panel display device having a compact size, light weight, and high quality of full color and high definition is increasingly required, and the technologies thereon has widely been studied all over the world.

Among the above mentioned flat panel display devices, since an electroluminescent display device (hereinafter called "ELD") is a solid-state type device (as compared to a liquid crystal display 'LCD'), it is widely used for special purposes where anti-vibration, anti-shock, and constant characteristics in wide range of operating temperature are required.

The ELD is given its name because it has a light-emitting layer, which generates light when a high voltage is applied between two electrodes between which a light-emitting layer is disposed. To develop a full color display device using the above described electrodes and light-emitting layer structure, three kinds of EL materials capable of generating red, green, and blue lights, luminescent thin film manufacturing method, and a relevant device structure should be developed. Thanks to the development of a red luminescence, green luminescence, luminescent material and relevant device structure, a multiple color luminescent panel can be manufactured in part. However, since the desired level of technology for a blue luminescent material having a high color purity, brightness, and luminescent material have not heretofore been achieved, there were many difficulties in manufacturing a blue luminescent device having a desired level.

In an attempt to resolve the above problems, one method of manufacturing an ELD capable of multiple color luminescence using a single luminescent film was introduced. That is, it was directed to manufacture a device capable of emitting red, blue, and green light by adding a special film processing technology to a single host material and a white-light emitting material manufactured by using a single or double luminescent center.

The luminescent device using the above-mentioned single luminescent film includes a substrate, a lower electrode disposed on the substrate, a first insulation layer disposed on the lower electrode, a light-emitting layer disposed on the first insulation layer, a second insulation layer disposed on the light-emitting layer, and a spaced apart upper electrode disposed on the second insulation layer. Here, an AC voltage is applied between the upper electrode and the lower electrode, respectively.

For enhancing the performance of an ELD, the material of the phosphore material and insulating layers is a very important factor.

A conventional white-light emitting EL device developed by using a single phosphor material is generally made of ZnS:Pr, SrS:Pr, SrS:Ce, Eu,K; however, an electroluminescent device made of a ZnS:Pr light-emitting layer using a conventional Pr single center emits a greenish white-light, so that an even spectral luminescence can not be achieved. Here, $SiN_x$, $Ta_2O_5$, $BaTiO_3$ are in general used for manufacturing the above described insulating layers.

In case of an ELD having an insulating layer of a $SiN_x$ single thin film, since a dielectric constant of the insulation layer has a range of 4~6, which is relatively low, a light emission threshold voltage of the ELD is disadvantageously increased due to the large voltage drop across the insulating layer.

Meanwhile, in case of a single thin film insulating layer of $Ta_2O_5$, the dielectric constant of the insulating layer has a range of 25~29, which is relatively high, so that the voltage drop is decreased due to the insulating layer, and the emission threshold voltage of the ELD is advantageously decreased; however, as operating time goes on, the characteristics of the threshold voltage disadvantageously are changed.

Among the materials of the insulating layer, the $BaTiO_3$ advantageously has a relatively high dielectric constant; however, the EL device using a material containing Ti, that is, it may be expressed as $ABO_3$ where A=Ba, Pb, Zr, and B=Ti, changes the composition of the interface between insulating layer and light-emitting layer so that the Ti and Ba penetrate into the adjacent luminescent film due to the high applied voltage or field while the device is operated by external voltage dirver. As a result, the light-emitting threshold voltage and brightness are significantly and disadvantageously decreased.

SUMMARY OF THE INVENTION

Accordingly, it is an object of the present invention to provide a white-light emitting electroluminescent display device and a manufacturing method thereof, which overcome the problems encountered in the conventional art.

It is another object of the present invention to provide an improved white-light emitting electroluminescent display device and a manufacturing method thereof capable of advantageously emitting light having red, blue and green emission components.

To achieve the above objects, there is provided a white-light emitting electroluminescent display device, which includes a substrate; a lower electrode disposed on the substrate; a first dielectric layer disposed on the lower electrode; a ZnS:Pr, Mn light-emitting layer disposed on the first dielectric layer; a second dielectric layer disposed on the light-emitting layer; and an upper electrode disposed on the second dielectric layer.

In addition, to achieve the above objects, an ELD according to the present invention further includes a substrate; a first electrode disposed on the substrate; a first dielectric layer formed on the first electrode layer by disposing a $BaTiO_3$ layer and a $Si_3N_4$ layer alternately thereon; a light-emitting layer formed on the first dielectric layer; a second dielectric layer formed on the light-emitting layer by disposing a $Si_3N_4$ layer and a $BaTiO_3$ layer alternately thereon; and a second electrode formed on the second dielectric layer.

To achieve the above objects, the present invention further provides a method of fabricating an ELD, which includes the steps of forming a first electrode on a substrate; forming a first dielectric layer by forming a $Si_3N_4$ inter-layer on the first electrode after forming a $BaTiO_3$ layer thereon; forming a light-emitting layer on the first dielectric layer; forming a second dielectric layer by forming a $BaTiO_3$ layer on the light-emitting layer after forming a $Si_3N_4$ layer thereon; and forming a second electrode on the second dielectric layer.

DETAILED DESCRIPTION OF THE INVENTION

Figure 1:
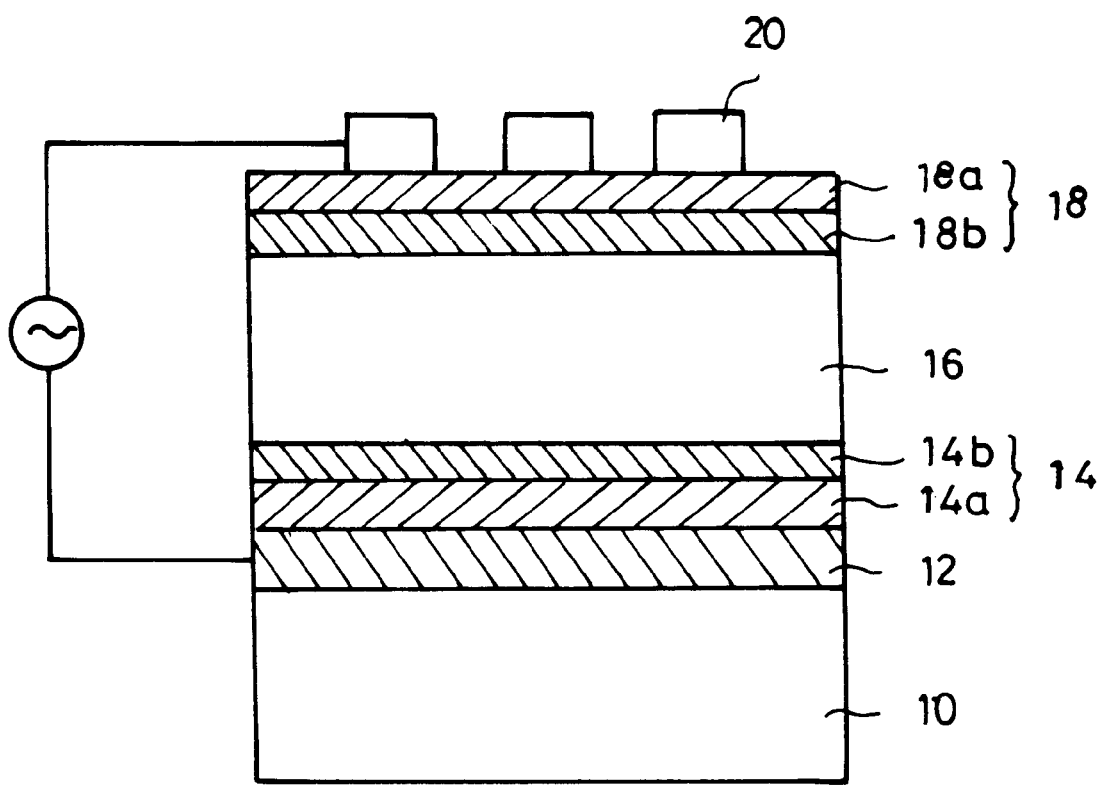
FIG. 1 is a cross-sectional view showing the construction of a white-light emitting electroluminescent display device according to the present invention.
Figure 2:
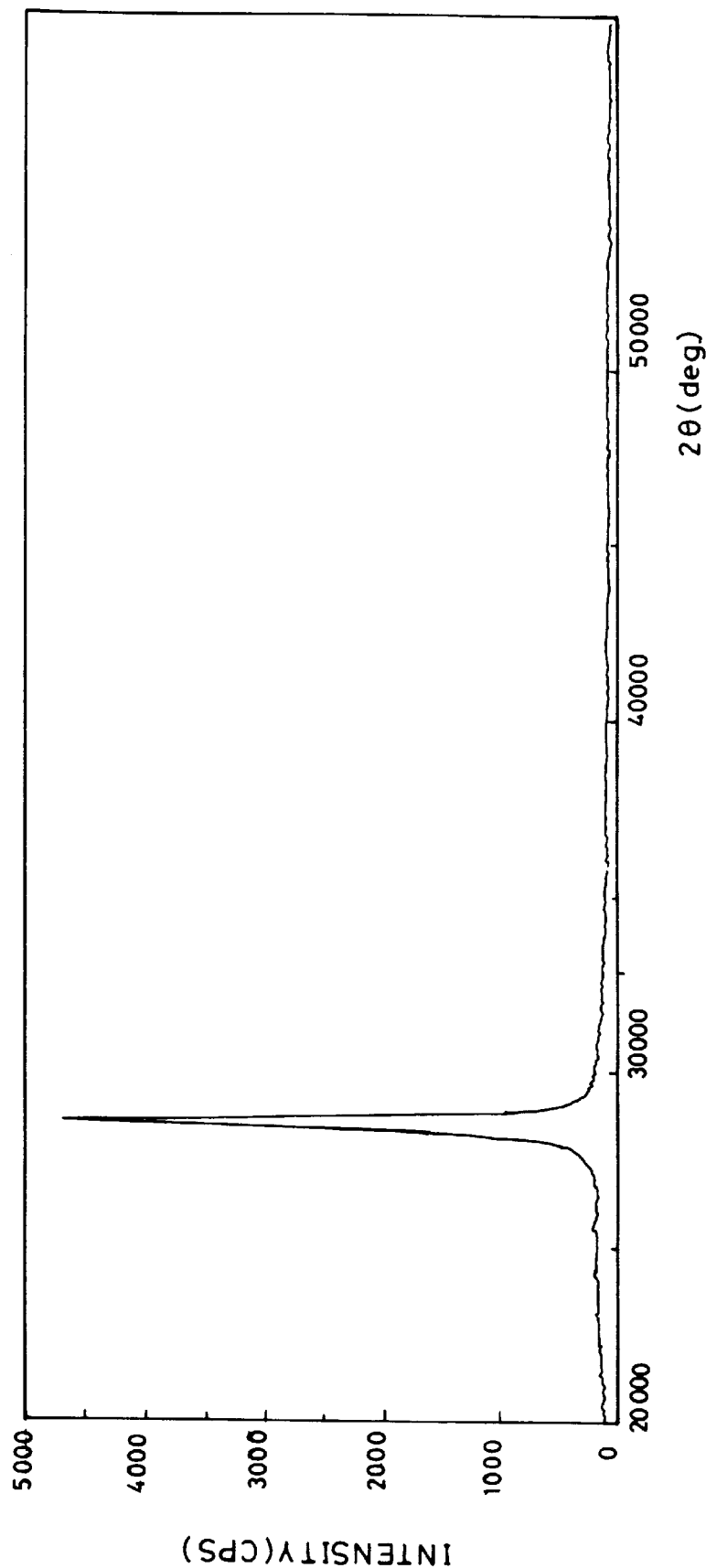
FIG. 2 is a graph showing a characteristic of a crystal structure of a thin film, which is vacuum-annealed after depositing ZnS:Pr, Mn of a white-light emitting electroluminescent display device according to the present invention.

As shown in FIG. 1, an ELD according to the present invention includes a substrate 10, a lower electrode 12, a first insulated layer 14, a $BaTiO_3$ layer 14a and a $Si_3N_4$ layer 14b are formed in order, a light-emitting layer 16, a second dielectric layer on which a $Si_3N_4$ layer 18b and a $BaTiO_3$ layer 18a are formed in order, and an upper electrode 22.

In case that ZnS:Pr, Mn is used for a luminescent material, of which 1.4~0.5 mol % of Pr is contained, and 0.1~0.01 mol % of Mn is contained, the thickness of the light-emitting layer formed thereof is in a range of 300~600 nm.

The chromaticity can be controlled by varying the doping concentration of the light-emitting centers of Pr and Mn.

The $BaTiO_3$ in an dielectric layers is an amorphous $BaTiO_3$ and the thickness thereof is 200~350 nm. In this case, the $Si_3N_4$ layer plays the role of an interlayer between the $BaTiO_3$ and light-emitting layers, and the thickness thereof is 50~100 nm (preferably 70~100 nm).

The white-light emitting electroluminescent device can, if necessary, include a passivation layer on the second dielectric layer for protecting the device from chemical penetration during an etching process of the upper electrode. The passivation layer can be formed by using a reactive sputtering method, and particularly in this case it is preferred to take the form of a $SiO_XN_Y$ passivation layer.

The white-light emitting electroluminescent device fabrication process according to the present invention includes the steps of forming the lower electrode on the substrate, forming the first dielectric layer in which a $BaTiO_3$ layer and a $Si_3N_4$ layer are formed in order, forming the ZnS:Pr, Mn light-emitting layer on the first dielectric layer, forming the second dielectric layer on the light-emitting layer, in which a $Si_3N_4$ layer and a $BaTiO_3$ are formed in order, and forming the upper electrode on the second dielectric layer.

The ZnS:Pr, Mn light-emitting material is made as follows.

To begin with, a ZnS, a powder containing Pr 1.4~0.5 mol % and Mn 0.1~0.01 mol % are prepared. Thereafter, the ZnS powder material mixed along with the powder of Pr and Mn is heat-processed in an electric furnace while flowing a gas mixture of $Ar:H_2=9:1$ for 1 hour at a temperature of 900~1050° C. Thereafter, it is required to grind the fired powder and to filter for obtaining a uniform particle size. The prepared powder is molded in the shape of a pellet having a diameter of about 10 mm and a thickness of about 3~5 mm using a commercial cold-press.

The light-emitting layer is formed using an E-beam evaporation method at a substrate temperature of 180~220° C. and under vacuum pressure of $5 \times 10^{-5}$ torr. At this time, in another crucible, in order to compensate the sulfur lost during the ZnS:Pr,Mn film deposition, solid sulfur is evaporated by resistive heating.

For better crystallization of a ZnS:Pr, Mn thin film and an effective substitution of Pr and Mn into the Zn sites in ZnS host, a standard post-annealing method may be used. That is, it is performed at a substrate temperature of 450° C. and under a pressure of $1 \times 10^{-5}$ torr for about one hour.

In the lower dielectric layers and the upper dielectric layers, a $BaTiO_3$ layer is formed under a plasma gas pressure of $10^{-3} \sim 10^{-2}$ torr, at a substrate temperature below 120° C., with a gas mixture of $O_2:Ar=1:4$. The $Si_3N_4$ layers are formed using a RF magnetron sputter method at room temperature, with a gas mixture of $Ar:N_2=8:2$ and under a pressure of $6 \times 10^{-3}$ torr.

Among the conditions for forming the $BaTiO_3$ layer, substrate temperature is an important factor. If the substrate temperature exceeds 120° C., a perfect amorphous $BaTiO_3$ is not formed. So, preferably the $BaTiO_3$ thin film is formed using a RF reactive magnetron sputtering method at an RF density of 2~6W/cm$_2$, under a pressure of $10^{-3} \sim 10^{-2}$ torr, at a substrate temperature below 120° C., and with a gas mixture of $O_2:Ar=10:20$.

As described above, a white-light emitting electroluminescent device according to the present invention includes a ZnS:Pr, Mn light-emitting layer, a $BaTiO_3/Si_3N_4$ first dielectric layer, and a $Si_3N_4/BaTiO_3$ second dielectric layer.

The white-light emitting electroluminescent device including a ZnS:Pr, Mn light-emitting layer according to the present invention may include a typical insulating material such as $SiN_x$, $Ta_2O_5$, $BaTiO_3$ and may preferably further include a first dielectric layer and a second dielectric layer, which are symmetrical to the light-emitting layer and have a $BaTiO_3/Si_3N_4$ structure, in which a $Si_3N_4$ layer thereof comes into contact with the light-emitting layer as a inter-layer.

In addition, the white-light emitting electroluminescent device including a dielectric layer consisting of $BaTiO_3$ and $Si_3N_4$ may include a typical luminescent material such as ZnS:Pr, SrS:Pr, SrS:Eu,Ce,K and may preferably further include a ZnS:Pr, Mn light-emitting layer.

EXAMPLE

To begin with, after forming a photo-etched ITO (Indium Tin Oxide) transparent electrode on a glass substrate, $BaTiO_3$ thin film was formed using an RF reactive magnetron sputtering on the transparent electrode by using a $BaTiO_3$ as a sputtering target at RF density of 2~6W/cm$^2$, under a plasma gas pressure of $10^{-3} \sim 10^{-2}$ torr, at a substrate temperature below 120° C. under a gas mixture of $O_2/Ar= 1:4$. Thereafter, the first dielectric layer was completed by forming a $Si_3N_4$ layer under a pressure of $6 \times 10^{-3}$ torr and with a gas mixture of $Ar:N_2=8:2$, keeping the substrate temperature to be at ambient temperature using a RF magnetron sputter method.

A ZnS:Pr,Mn light-emitting layer was formed using an E-beam evaporation method under a vacuum pressure of $5\times10^{-5}$ torr and at a substrate temperature 180~220° C. after first making a ZnS:Pr,Mn light-emitting material by doping Pr 1.4~0.5 mol % and Mn (purity 4N) 0.1~0.01 mol % to a ZnS host material; in this case the thickness of the light-emitting layer was 300~600 nm.

The ZnS:Pr,Mn light-emitting film was vacuum-annealed at a substrate temperature of 450°, under a vacuum of $1\times10^{-5}$ torr for one hour.

The second dielectric layer including the $Si_3N_4/BaTiO_3$ layer was formed on the light-emitting layer by the same process as in forming the first dielectric layer 14, but in reverse order.

Spaced apart aluminum upper electrodes were formed on the second dielectric layer by depositing aluminum for an electrode to have a thickness of about 1500 Å using a heat deposition method and by patterning it using a lift-off process.

Thereafter, to prevent moisture and dirty particles penetration into the inside of the device and physical damage, ELD was covered with a backplate(glass) and filled with the silicone oil through the etched hole. Thereafter, the device was sealed with epoxy resin and then placed on a PCB substrate and interconnected to driving terminals using a zebra connector.

Figure 3A:
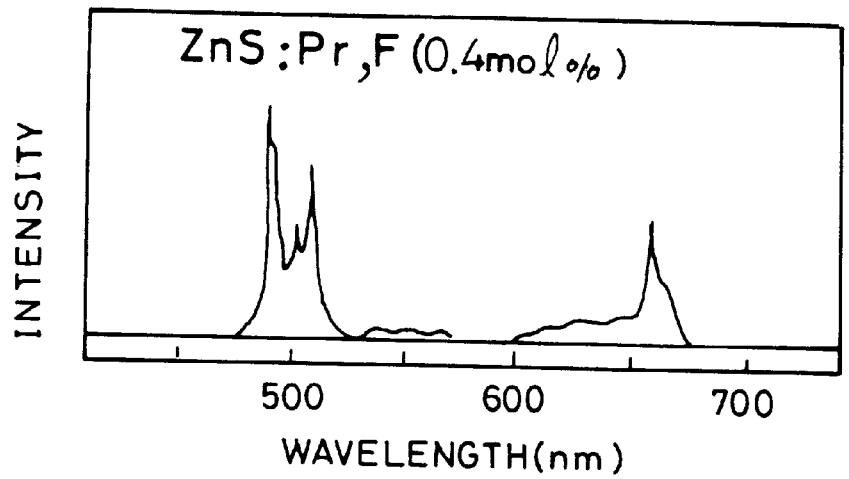
FIG. 3A is an electroluminescence spectrum of a conventional electroluminescent display having a luminescent thin film of ZnS:Pr.
Figure 3B:
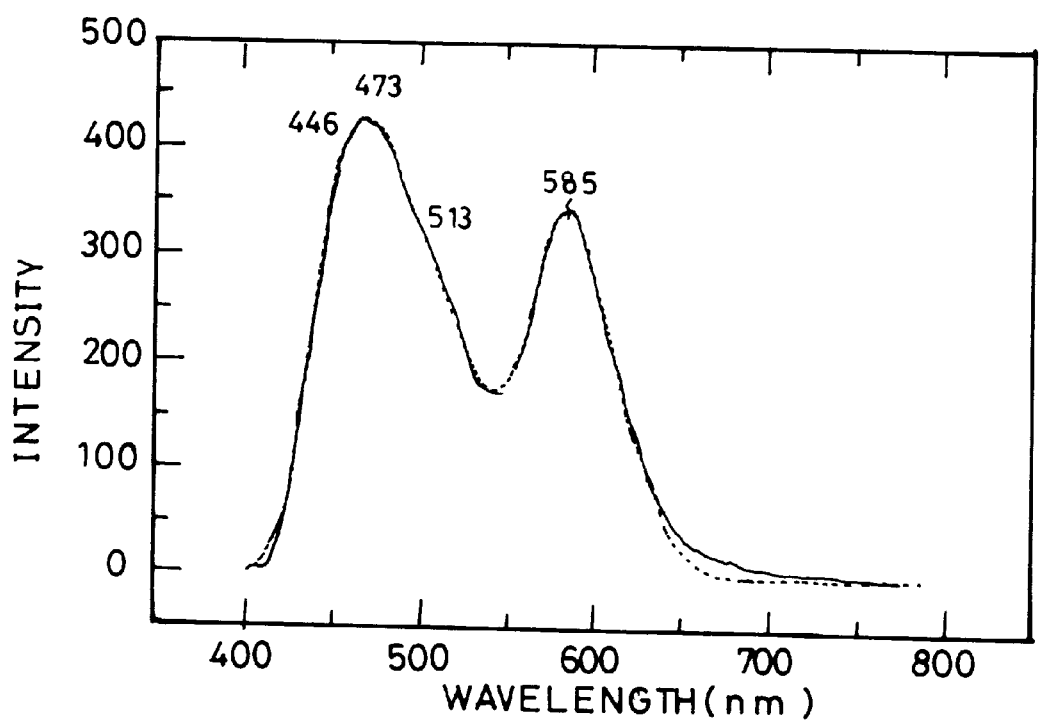
FIG. 3B is an electroluminescence spectrum of an electroluminescent display having a luminescent thin film of ZnS:Pr, Mn according to the present invention.

FIG. 3 shows the diffraction of a vacuum-annealed light-emitting layer by using a X-ray diffraction method. As shown therein, a typical peak 111 of a cubic-phase ZnS is observed so strongly that the crystallinity of the ZnS:Pr,Mn thin film is proper for a light-emitting layer of an EL device.

Figure 4:
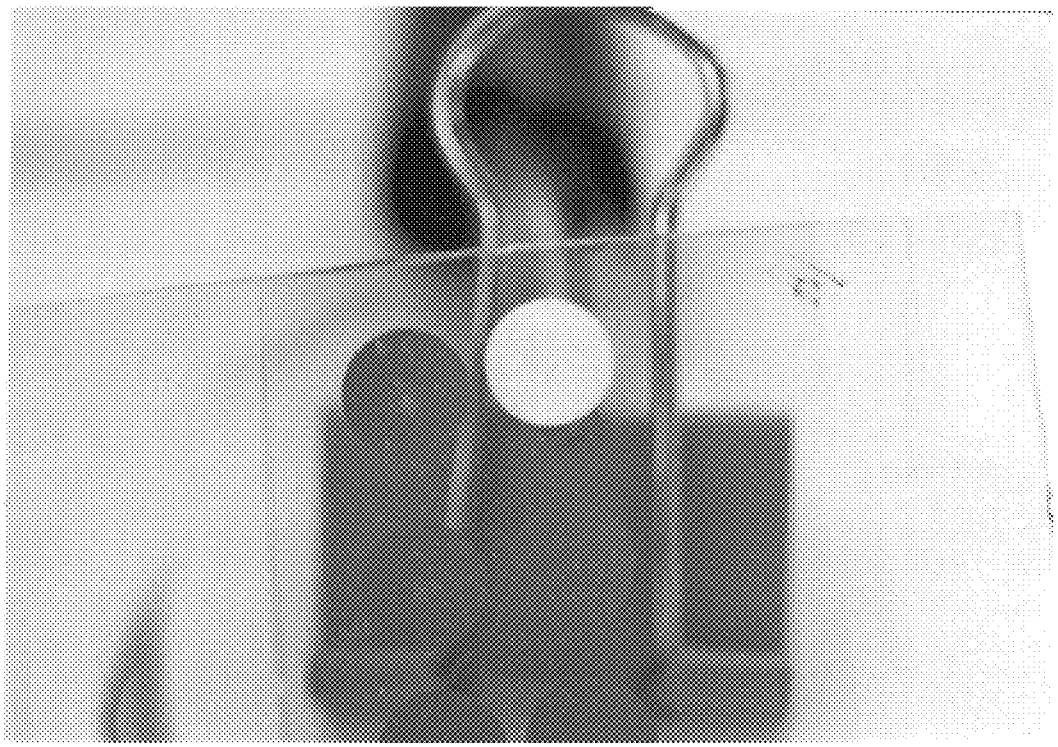
FIG. 4 is a photograph taken during a light-emitting process of a white-light emitting electroluminescent display according to the present invention.
Figure 4:
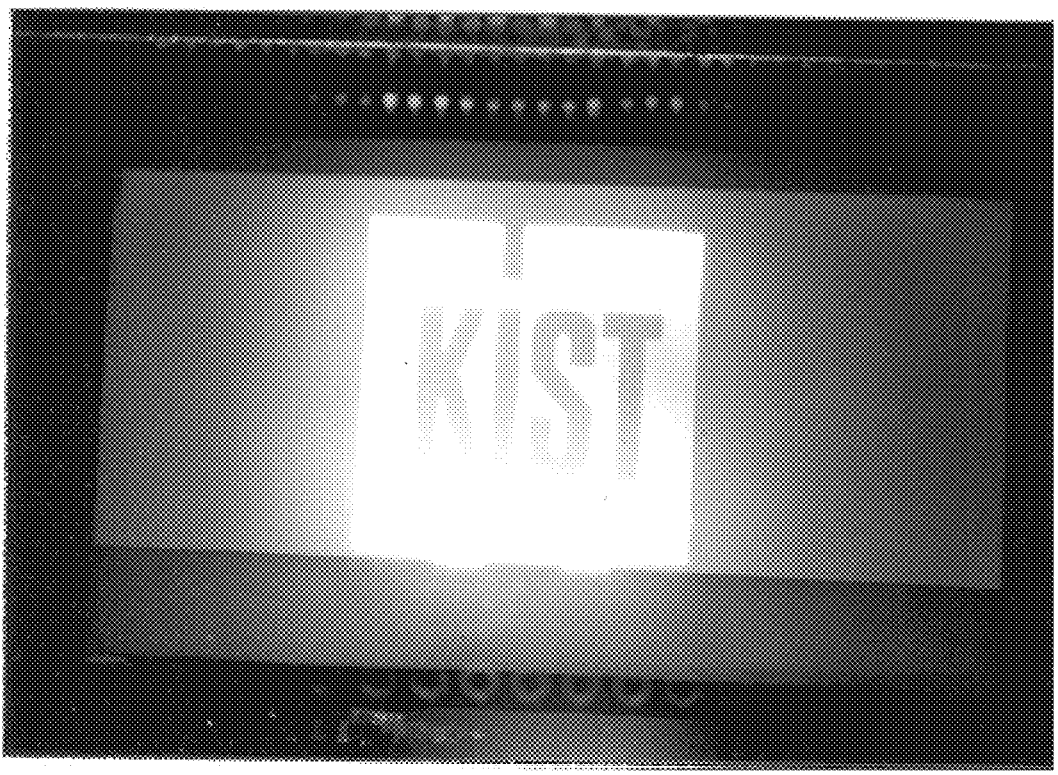

FIG. 4A shows the emission spectrum of an ELD containing only a Pr center in a conventional ZnS host; however, FIG. 4B shows an EL spectrum of a white-light emitting ELD containing Pr and Mn in a ZnS host according to the present invention.

In the case of the ELD manufactured by the present invention, the electroluminescent spectrum is more broadly distributed over a visible spectrum region compared with the conventional devices.

What is claimed is:

1. A white-light emitting electroluminescent display device, comprising:

a substrate;

a first electrode disposed on said substrate;

a first dielectric layer disposed on said first electrode;

a light-emitting layer disposed on said first dielectric layer;

a second dielectric layer disposed on said light-emitting layer; and a second electrode disposed on said second dielectric layer, wherein said light-emitting layer consists essentially of ZnS:Pr,Mn.

2. The device of claim 1, wherein said ZnS:Pr,Mn light-emitting layer is made of Pr in an amount of 1.4~0.5 mol % and Mn in an amount of 0.1~0.01 mol %.

3. The device of claim 1, wherein said Zns:Pr,Mn light-emitting layer has a thickness range of 300~600 nm.

4. The device of claim 1, wherein said second dielectric layer has a passivation layer additionally disposed thereon.

5. A white-light emitting electroluminescent display device, comprising:

a substrate;

a first electrode disposed on said substrate;

first dielectric layers formed on said first electrode by disposing a $BaTiO_3$ layer and a $Si_3N_4$ layer alternately thereon;

a light-emitting layer formed on said first dielectric layers;

second dielectric layers formed on said light-emitting layer by disposing a $Si_3N_4$ layer and a $BaTiO_3$ layer alternately thereon; and a second electrode formed on said second dielectric layers.

6. The device of claim 5, wherein said $BaTiO_3$ is an amorphous $BaTiO_3$.

7. The device of claim 5, wherein said $BaTiO_3$ has a thickness range of 200~350 nm.

8. The device of claim 5, wherein said $Si_3N_4$ has a thickness range of 70~100 nm.

9. A white-light emitting electroluminescent display device, comprising:

a substrate;

a first electrode disposed on said substrate;

first dielectric layers formed on said first electrode by disposing a $BaTiO_3$ layer and a $Si_3N_4$ layer alternately thereon;

a light-emitting layer comprising ZnS as a host material disposed on said first dielectric layers; second dielectric layers formed on said light-emitting layer by disposing a $Si_3N_4$ layer and a $BaTiO_3$ layer alternately thereon; and a second electrode formed on said second dielectric layers.

10. The device of claim 9, wherein said $BaTiO_3$ is an amorphous $BaTiO_3$.

11. The device of claim 9, wherein said light-emitting layer is ZnS:Pr,Mn light-emitting layer.

12. The device of claim 9, wherein said second dielectric layers have a passivation layer additionally disposed thereon.

* * * * *